United States Patent
Kanbe et al.

[11] Patent Number: 6,080,476
[45] Date of Patent: Jun. 27, 2000

[54] MAGNETIC RECORDING MEDIUM AND MAGNETIC RECORDING SYSTEM USING SUCH A MAGNETIC RECORDING MEDIUM

[75] Inventors: Tetsuya Kanbe, Yokohama; Yoshio Takahashi, Kunitachi; Akira Ishikawa, Kodira; Ichiro Tamai, Yokohama; Yuzuru Hosoe, Hino; Yoshifumi Matsuda, Odawara; Kiwamu Tanahashi, Fujisawa; Tomoo Yamamoto, Hachioji, all of Japan

[73] Assignee: Hitachi, Ltd., Tokyo, Japan

[21] Appl. No.: 09/048,167

[22] Filed: Mar. 25, 1998

[30] Foreign Application Priority Data

Mar. 28, 1997 [JP] Japan ................... 9-077174

[51] Int. Cl.$^7$ ....................................... G11B 5/66
[52] U.S. Cl. ............. 428/332; 428/336; 428/694 T; 428/694 TS; 428/694 TM; 428/694 R; 428/900; 360/113; 324/252
[58] Field of Search ............ 105/694 T, 694 TS, 105/694 TM, 332, 336, 900, 694 R; 360/113; 324/252

[56] References Cited

FOREIGN PATENT DOCUMENTS

| 07311929 | 11/1986 | Japan . |
| 62-257618 | 11/1987 | Japan . |
| 63-197018 | 8/1988 | Japan . |
| 6243454 | 2/1994 | Japan . |
| 6342511 | 12/1994 | Japan . |
| 6349047 | 12/1994 | Japan . |
| 877544 | 3/1996 | Japan . |
| 8147660 | 6/1996 | Japan . |
| 7311929 | 11/1996 | Japan . |

OTHER PUBLICATIONS

J. Appl. Phys. vol. 63(8), Apr. 15, 1988, pp. 3248–3253, "Magnetic studies of thin metallic films", J. G. Zhu et al.

J. Appl. Phys. vol. 79(8), Apr. 15, 1996, pp. 5339–5341 "Dependence of media noise on grain size and intergranular coupling in thin–film media" A. Kikuchi et al.

IEEE Transactions on Magnetics, vol. 30, No. 6, Nov. 1994, pp. 4230–4232, "Thermal instability at Gbit/in$^2$ magnetic recording" Pu–Ling La et al.

*Primary Examiner*—Leszek Kiliman
*Attorney, Agent, or Firm*—Kenyon & Kenyon

[57] ABSTRACT

It is an object of the present invention to provide a magnetic recording medium which has a magnetic layer deposited on a substrate through a single-layer underlayer or a multilayer-underlayer, the magnetic layer includes magnetic crystal grains having an acicular structure or amorphous magnetic particles, an average grain size of the magnetic grain and a grain-size dispersion normalized by the average grain size are less than 16 nm and less than 0.5, respectively, a value $Ku \cdot v/kT$ which results from dividing a product of a magnetic anisotropy constant $Ku$ and a volume $v$ of the magnetic grain by a product of a Boltzmann constant $k$ and an absolute temperature $T$ is selected to be greater than 60, and a film thickness of the magnetic layer falls within twice of the average grain size. Thus, there can be realized a magnetic recording system in which a media noise can be reduced, a high S/N and a low bit error rate can be obtained and which has a high recording density of 2 gigabits per one square inches and an MTBF (mean time between failure) of higher than 300000 hours.

8 Claims, 9 Drawing Sheets

MAGNETIC RECORDING MEDIUM AND MAGNETIC RECORDING SYSTEM USING SUCH A MAGNETIC RECORDING MEDIUM

BACKGROUND OF THE INVENTION

The present invention relates to a magnetic recording system, and more particularly, is directed to a magnetic recording system having a recording density higher than 2 gigabits per one square inches and a thin film magnetic recording medium having a low media noise but having a sufficient stability against a thermal fluctuation in order to become able to realize such a magnetic recording system.

At present, there is an increasing demand that a magnetic recording system becomes larger in storage capacity. As a magnetic head, there has hitherto been used an inductive head which makes effective use of a phenomenon in which a voltage is changed as a magnetic flux is changed with a time. According to the above-mentioned inductive head, a single magnetic head is able to both write and read information in and from a magnetic recording medium.

Recently, there is rapidly spread a combination type magnetic head comprising a record head and a write head and in which a magnetoresistive head of a higher efficiency is used as the read head. The magnetoresistive head makes effective use of a phenomenon in which an electric resistance of a head element is changed in accordance with a change of a leakage flux from a magnetic recording medium. On the other hand, there has hitherto been developed a head of a much higher efficiency which makes effective use of a considerably large magnetoresistive change (i.e. giant magnetoresistive effect or spin valve effect) generated in a magnetic layer of the type such that a plurality of magnetic layers are laminated with each other through a non-magnetic layer. This giant magnetoresistive effect is such one that relative directions of magnetization of a plurality of magnetic layers laminated with each other through the non-magnetic layer are changed by a leakage field from Et magnetic recording medium, thereby resulting in an electric resistance being changed.

To realize a high recording density, it becomes necessary to further reduce a media noise. A study of measured results obtained by a computer simulation and measured results obtained by experiments reveals that, in order to reduce a media noise, it is effective to reduce an exchange interaction between magnetic crystal grains or to reduce a grain size of a magnetic crystal grain (J. Appl. Phys., Vol. 63(8), 3248 (1988), J. Appl. Phys., Vol. 79(8), 5339 (1966)). Specifically, as a method of reducing an exchange interaction, there are mainly enumerated a method of increasing a Cr content in a magnetic layer, a method of increasing a spatial separation of magnetic crystal grains and the like. When the Cr content of the magnetic layer is increased, a larger amount of Cr may be segregated into the crystal grains, thereby decreasing the exchange interaction between the magnetic crystal grains. However, at the same time, the Cr content in the magnetic crystal grains also is increased, thereby resulting in a saturated magnetic flux density being lowered. Therefore, the film thickness of the magnetic layer should be increased in order to maintain a value of Br×t which is a product of a residual magnetic flux density Br and a film thickness t of a magnetic layer. However, since the crystal grain increases its size as the film thickness of the magnetic layer increases thereby to cause a media noise to increase, this method has a limit. Moreover, in order to increase the separation of the magnetic crystal grains, it is necessary to reduce a size of crystal grains of each underlayer having an acicular structure. To this end, a film thickness of an underlayer has to be increased. Also in this case, it is unavoidable that a size of a magnetic crystal grain formed on the under-layer is increased. Thus, this method also has a limit.

Further, Japanese laid-open patent application No. 7-311929 describes a method in which oxide such as $SiO_2$ is added to a magnetic layer, the resultant product is segregated into the crystal grains thereby to reduce an exchange interaction between crystal grains and in which, at the same time, a grain size of a crystal grain ay be decreased by suppressing a crystal growth. However, because the addition of the insulating material causes a resistance value of a target to increase considerably, it is unavoidable that a film is deposited by an RF (radio frequency) sputtering. As compared with a DC (direct current) sputtering, the RF sputtering is inferior to the DC sputtering from a standpoint of a manufacturing cost and a stability or the like, and hence is not suitable for a mass-production. Moreover, since a crystallographic orientation of a magnetic recording medium manufactured by the RF sputtering is difficult to control, there arises such a problem that it is very difficult to obtain a high coercivity and a coercivity squareness.

Furthermore, since the magnetic crystal grain of which the grain size is reduced is much more strongly affected by the influence of the thermal fluctuation, a stability of: a recorded magnetization is lowered considerably. As a consequence, a ratio in which an inversion of magnetization occurs increases with a time so that it becomes unable to maintain a sufficiently high reliability when data is saved during a long period of time. Further, since the crystal grain the grain size of which is reduced is much more strongly affected by a magnetostatic interaction from the adjacent crystal grain, there is unavoidably caused the increase of a media noise. Accordingly, it is desirable that the crystal grain should keep a certain large size.

On the other hand, heretofore, there have been reported a Large number of experiments in which a magnetic layer is formed as a bilayer or a multilayer. Japanese laid-open patent application No. 8-147660, for example, describes a magnetic recording medium having a high coercivity and a low media noise. This magnetic recording medium comprises two magnetic layers in which a first magnetic layer is formed of a CoCrTa alloy layer and a second magnetic layer is formed of a CoCrPtTa alloy layer. However, according to this previously-proposed magnetic recording medium, since an influence exerted by excessively small crystal grains existing at the initial crystal growth portion of the magnetic layer cannot be eliminated, there cannot be expected an effect for suppressing a decay of a read signal due to a thermal fluctuation. The decay of the read signal due to the thermal fluctuation becomes a serious problem particularly when the magnetic layer is reduced in thickness. Also, Japanese laid-open patent application No. 8-77544, for example, describes a magnetic recording medium having a high coercivity in which a magnetic layer has a bilayer laminated structure comprising a soft magnetic layer and a hard magnetic layer. However, if the magnetic layer contains the soft magnetic layer, there is then the large possibility that a media noise will increased due to a strong exchange interaction. Further, such a magnetic recording medium should not be preferable because it is easily affected by an external magnetic field. Furthermore, Japanese laid-open patent application No. 6-243454, Japanese laid-open patent application No. 6-342511 and Japanese laid-open patent application No. 6-349047, for example, describe magnetic recording media in which a magnetic layer is divided by a non-magnetic intermediate layer such as a Cr non-magnetic layer. Since the non-magnetic intermediate layer weakens the exchange interaction between the divided magnetic layers, the size of the magnetization inversion is reduced, and as a result, a media noise can be reduced. However, as is described in IEEE TRANSACTIONS ON MAGNETICS, Vol. 30, pp. 4230–4232 (published in 1994), since a magnetostatic interaction acts on the divided magnetic layers, if the size of the magnetization inversion is reduced to such an extent that it is affected by a thermal fluctuation, there is then the possibility that a magnetization will be canceled by this negative interaction out.

As described above, in the magnetic recording media using the multilayer magnetic layer according to the examples of the related art, although magnetic properties can be improved to some extent but such improvements are not sufficient. Besides, it cannot be expected to suppress the influence of the thermal fluctuation which becomes remarkable particularly when the magnetic layer is reduced in thickness. Therefore, the above-mentioned magnetic recording media according to the related art are not sufficient for realizing a high recording density which is greater than 2 gigabits per square inches.

As described above, in order to realize a high recording density, it becomes necessary to provide a magnetic recording medium which not only has a low media noise but also has a sufficiently high stability against a thermal fluctuation.

SUMMARY OF THE INVENTION

In view of the aforesaid aspect, it is an object of the present invention to provide a magnetic recording medium having not only a low media noise but also a sufficiently high stability against a thermal fluctuation by controlling an average grain size and a grain-size dispersion of a magnetic crystal so as to fall within a range of proper values.

It is another object of the present invention to provide a highly-reliable magnetic recording system having a high recording density higher than 2 gigabits per one square inches by a combination of this magnetic recording medium and a magnetic head of a high efficiency.

The above-mentioned objects can be achieved by a magnetic recording medium comprising a substrate and a magnetic layer deposited on the substrate through a single underlayer or a multilayer underlayer and in which an average grain size <d> of a crystal grain in the magnetic layer is selected to be less than 16 nm and a grain-size dispersion $\Delta d/<d>$ (hereinafter referred to as "normalized grain-size dispersion") normalized by the average grain size is selected to be less than 0.5.

The manner in which the crystal grain size and the normalized grain-size dispersion are calculated will be described below. Initially, a magnetic recording medium is polished to a thickness of several 10s of microns, and a film thickness of a magnetic layer is reduced to about 10 nm by ion thinning. Then, a lattice image is observed in a high resolution mode under a transmission electron microscope (TEM), and there is obtained a plane TEM image (lattice image) of about ×1000000 to ×2000000 developed on a printing paper. Further, this lattice image is read in by an image scanner, the lattice image is displayed on a screen of a personal computer, and lines are drawn along a grain boundary, thereby resulting in a crystal grain boundary network being manufactured. At that time, the grain boundary is used as a portion in which a lattice stripe is changed (crossed). When there is observed a structure in which a plurality of magnetic crystal grains with different crystal orientations are grown on the same underlayer crystal grain, i.e. bi-crystal structure, crystal grains (sub grains) having the same crystal orientation are counted as one crystal grain. FIG. 1 shows an example of the crystal grain boundary network thus obtained. An area of each crystal grain encircled by this grain boundary network was calculated by using a commercially-available particle analysis software, and a diameter of a true circle having the same area as that of the above-mentioned crystal grain was set to the grain size of each crystal grain. Crystal grain sizes of 100 to 300 crystal grains were calculated by the above-mentioned method. A value which results from normalizing a sum total of areas of some crystal grains the grain sizes of which are less than the observed crystal grains by the total areas of all measured crystal grains was defined as an accumulated area fraction. FIG. 2-(a) shows an example of a relationship (hereinafter referred to as "accumulated area fraction curve") between the magnetic crystal grain size of the medium according to the present invention and the accumulated area fraction. FIG. 2-(b) shows an example of a histogram of a grain-size frequency. Herein, the average grain size <d> is defined as a grain size obtained when the accumulated area fraction becomes 50%, and the grain-size dispersion width is defined as a difference between a grain size obtained when the accumulated area fraction becomes 75% and a grain size obtained when the accumulated area fraction becomes 25%. Further, a ratio $\Delta d/<d>$ between the grain-size dispersion width $\Delta d$ and the above-mentioned average grain size: <d> is defined as a normalized grain-size dispersion. Incidentally, when a magnetic particle is amorphous, a grain size is analyzed based on a bright visual field image of a magnetic layer by a similar method.

When the average grain size becomes larger than 16 nm, if information is recorded with a high linear recording density greater than 200 kFCI, then a disturbance (irregularity) of a magnetization transition area becomes large and a media noise increases, which should not be preferable. Also, if the normalized grain-size dispersion exceeds 0.5, then the number of extremely-small crystal grains increases and these extremely-small crystal grains are strongly affected by the influence of the thermal fluctuation with the result that a decay of recorded magnetization becomes considerable, which should not be preferable. Furthermore, at that time, it is not preferable that the media size also increases. As described above, not only to reduce the grain size of the magnetic crystal grain simply but also to exclude extremely-small crystal grains, which are easily affected by the thermal fluctuation, by making the grain sizes of the magnetic crystal grains become uniform are very important factors for reducing the media noise and for maintaining the stability against the thermal fluctuation. If the normalized grain-size dispersion is selected to be less than 0.4 as seen in the inventive example 2 which will be described later on, then the media noise can be further decreased and the thermal stability can be further improved, which are more preferable. Furthermore, the control of the magnetic crystal grain size becomes an extremely-effective noise reducing means for a magnetic recording medium using a glass substrate which is difficult to reduce a media noise as compared with a related-art magnetic recording medium using, in particular, an NiP/Al substrate.

Although a magnetic layer may be made of alloys using Co such as CoCrPt, CoCrPtTa, CoCrPtTi, CoCrTa or CoNiCr as principal components and which also contains Cr, Co alloy containing Pt should preferably be used in order to obtain a high coercivity. If a value $Ku \cdot v/kT$ which results from dividing a product of a magnetic anisotropy energy $Ku$ of a magnetic crystal grain and a volume $v$ by a product of a Boltzmann constant k and an absolute temperature T is selected to be greater: than 60, then it becomes possible to reduce the influence of the thermal fluctuation. If the value of Ku·v/kT becomes less than 60, then there rapidly increases the probability that the inversion of the magnetization will occur due to the influence of the thermal fluctuation. As a result, the decay of the recorded magnetization becomes remarkable, which is not preferable. Further, particularly in a magnetic recording medium in which a grain size of a magnetic layer becomes less than 10 nm, the magnetic layer should preferably be made of a high Ku material such as alloys having a high Pt content in the magnetic layer or alloys containing rare-earth elements such as SmCo or FeSmN. The film thickness of the magnetic layer should preferably be less than twice the average grain size. If the film thickness of the magnetic layer exceeds twice the average grain size, then a shape magnetic anisotropy in the direction perpendicular to the film surface is increase so that a coercivity in the in-plane direction decreases, which should not be preferable.

If on the other hand the above-mentioned value of Ku·v/kT increases excessively, then a coercivity increases. As a result, there arises a problem that a sufficient overwrite property cannot be obtained during write/read operation. Having variously examined the medium structures which are able to provide an excellent overwrite property, the assignee of the present application discovered that such a medium structure is very effective in which a magnetic layer is formed as a bilayer structure wherein a Pt content in a magnetic layer (hereinafter referred to as "first magnetic layer") adjoining an underlayer is made higher than a Pt content in a magnetic layer (hereinafter referred to as "second magnetic layer") deposited on the first magnetic layer. When the Pt content in the first magnetic layer is made high, there can be achieved the effect for suppressing excessively-small particles in the initial growth portion of the magnetic layer from being fluctuated thermally. When the Pt content in the second magnetic layer is made low, a value of a coercivity may be optimized. Further, if a Cr content in the first magnetic layer is made lower than a Cr content in the second magnetic layer thereby to leave a proper exchange interaction between the grains, then it is possible to improve the above-mentioned effect. Specifically, the excessively-small grains in the initial growth portion of the magnetic layer are magnetically combined to make a substantial magnetization inversion size become larger than the grain size, whereby the influence of the thermal fluctuation may be suppressed. Therefore, the thickness of the first magnetic layer should preferably be made approximately the same as that of the initial film deposition portion of the magnetic layer. Since the thickness of the initial film deposition portion is about 5 nm at the maximum although it is changed depending upon the combination of the underlayer and the magnetic Layers and the film deposition process or the like, the film thickness of the first magnetic layer should preferably be made less than 5 nm. Furthermore, the total film thickness of the first magnetic layer and the second magnetic layer should preferably be made less than 15 nm from a standpoint of increasing a resolution of a magnetic recording medium.

With respect to the magnetic properties of the magnetic layer, if a coercivity measured when a magnetic field is applied to the recording direction is set to be greater than 2 kOe and the product Br×t of the residual magnetic flux density Br and the film thickness t is set to be greater than 40 Gauss·micron and smaller than 140 Gauss×micron, then excellent read/write characteristics should be obtained in a recording density region the recording density of which is higher than 2 gigabits per one square inches, which should be preferable. If a coercivity becomes smaller than 2 kOe, then the output at the high recording density (greater than 200 kFCI) becomes small, which should not be preferable. Also, if the product Br×t becomes larger than 140 Gauss·micron, then the resolution is lowered. If on the other hand the product Br×t becomes smaller than 40 Gauss·micron, then the read output becomes small, which should not be preferable.

Further, if a carbon layer having a thickness ranging from 5 nm to 20 nm is formed as a protective layer of a magnetic layer and a lubricant layer having a thickness ranging from 2 nm to 10 nm is made of perfluordalkyl-polyether or the like having an adsorptive property, then there can be obtained a highly-reliable magnetic recording medium which is capable of executing a high density recording. Further, if a carbon film added with hydrogen, a film made of a compound such as silicon carbide, tungsten carbide, (W—Mo)—C, (Zr—Nb)—N or a mixed film of these compounds and carbon is used as a protective layer, then a slide resistance and a corrosion resistance can be improved, which should be preferable. Furthermore, after these protective layers are formed, if the surface is made very slightly uneven by plasma etching with a particle mask or protrusions of different phases are produced on the surface of the protective layer by using targets of compound, and mixtures or the surface is made uneven by heat treatment, then a contact area in which the head and the magnetic recording medium are brought in contact with each other may be reduced. Hence, the problem that the head adheres to the surface of the medium upon CSS (contact start stop) operation can be avoided, which should be preferable.

In a magnetic recording system comprising the above-mentioned magnetic recording medium, a head access system for driving this magnetic recording medium in the recording direction, a magnetic head composed of a write unit and a read unit, a means for moving the magnetic head relative to the magnetic recording medium and a read/writes signal processing means for writing a signal on the magnetic head and reading an output signal from the magnetic head, if the read unit of the magnetic head is formed of a magnetoresistive head, it is possible to obtain a sufficiently-high intensity of signal in a high recording density. Thus, there may be realized a highly-reliable magnetic recording system which may provide a recording density of higher than 2 gigabits per one square inches. Also, a spacing (shield spacing) between taco shield layers which sandwich a magnetoresistive sensor unit of the magnetoresistive head used in the magnetic recording system according to the present invention should preferably be made less than 0.30 μm. The reason for this is that, if the shield spacing becomes greater than 0.30 μm, then a resolution is lowered, and a phase jitter of a signal increases. Furthermore, if the magnetoresistive head is comprised of a magnetoresistive sensor including a plurality of conductive magnetic layers which are able to generate a large charge of a resistance as the magnetization directions thereof are relatively changed with an application of an external magnetic field and a conductive non-magnetic layer disposed between the conductive magnetic layers and a giant magnetoresistive effect or a spin valve effect is used, then an intensity of a signal can be further increased. Thus, it becomes possible to realize a highly-reliable magnetic recording system having a recording density higher than 4 gigabits per one square inches.

DETAILED DESCRIPTION OF THE PREFERRED EMBODIMENT

The present invention will now be described with reference to the accompanying drawings.

<Inventive Example 1>

Figure 1:
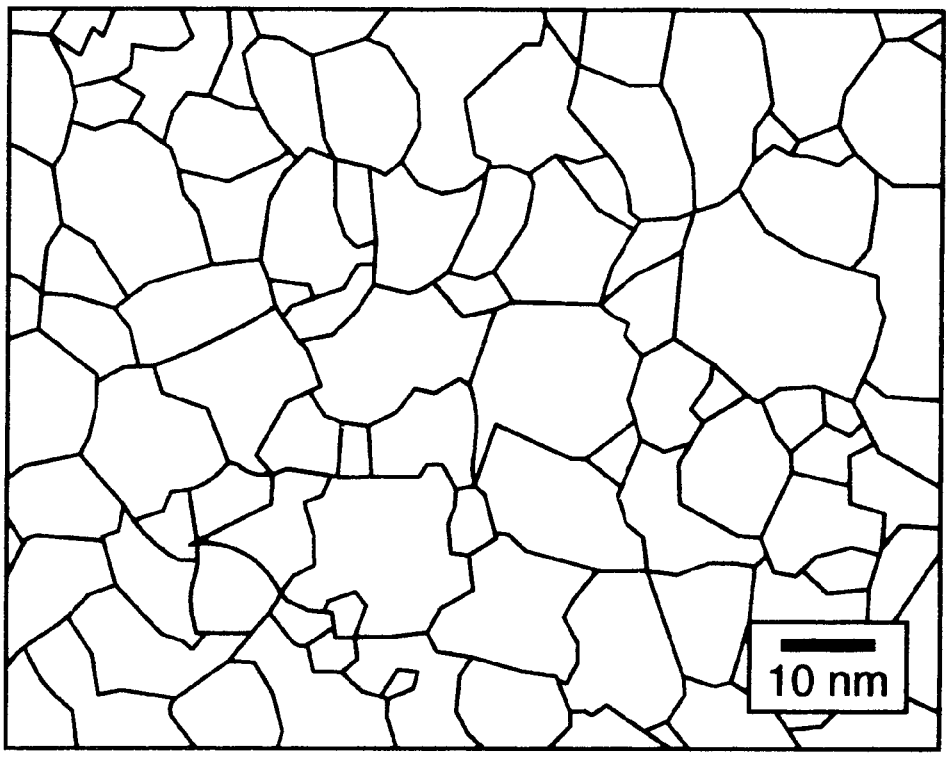
FIG. 1 is a diagram showing a crystal grain boundary network in a magnetic recording medium according to an embodiment of the present invention.
Figure 2:
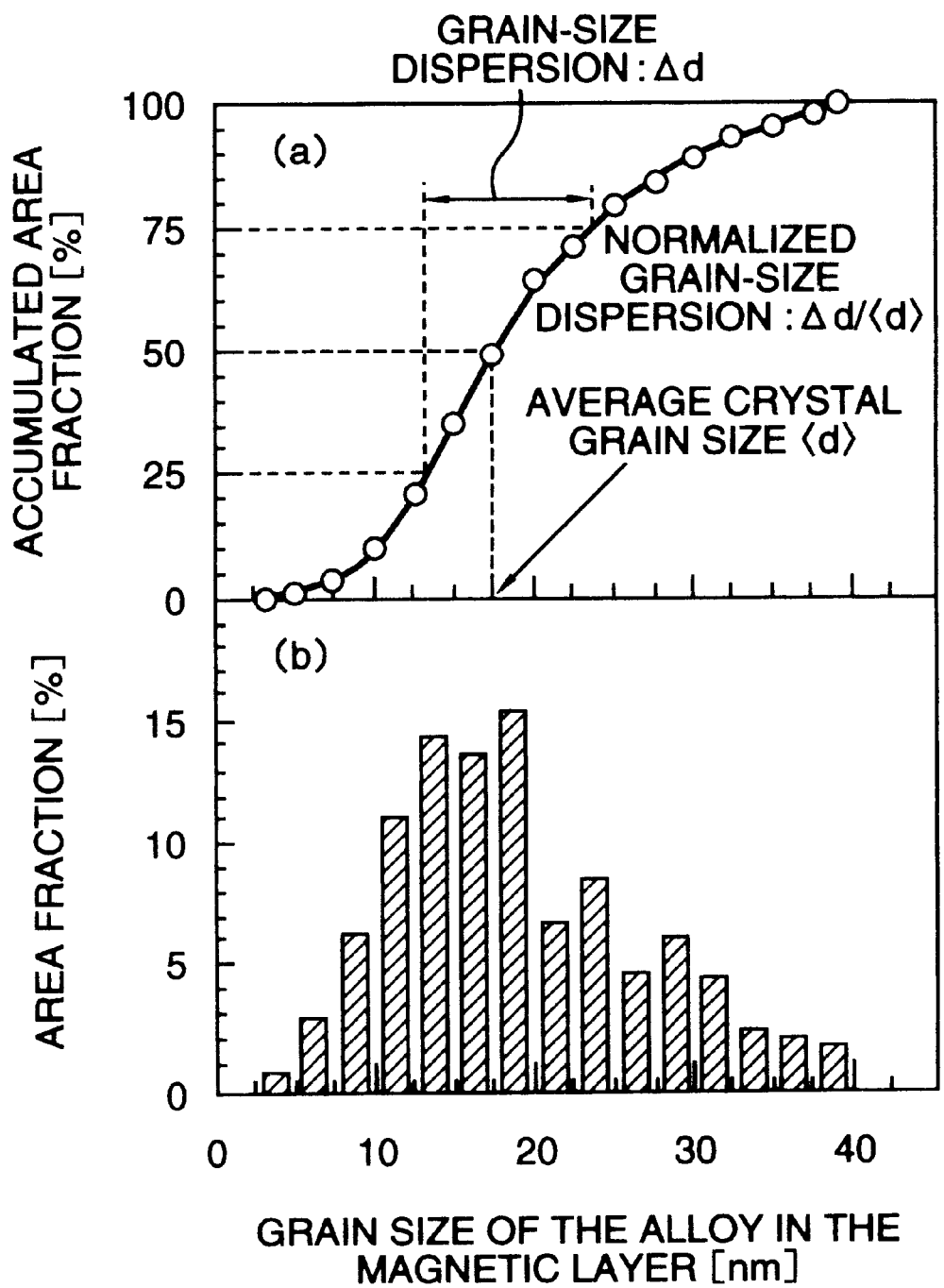
FIG. 2 is a graph showing a characteristic curve showing a relationship between an average grain size of a magnetic crystal grain, an accumulated area fraction and an accumulated area (a) and a histogram of a grain-size frequency (b) in a magnetic recording medium according to an embodiment of the present invention, respectively.
Figure 3A:
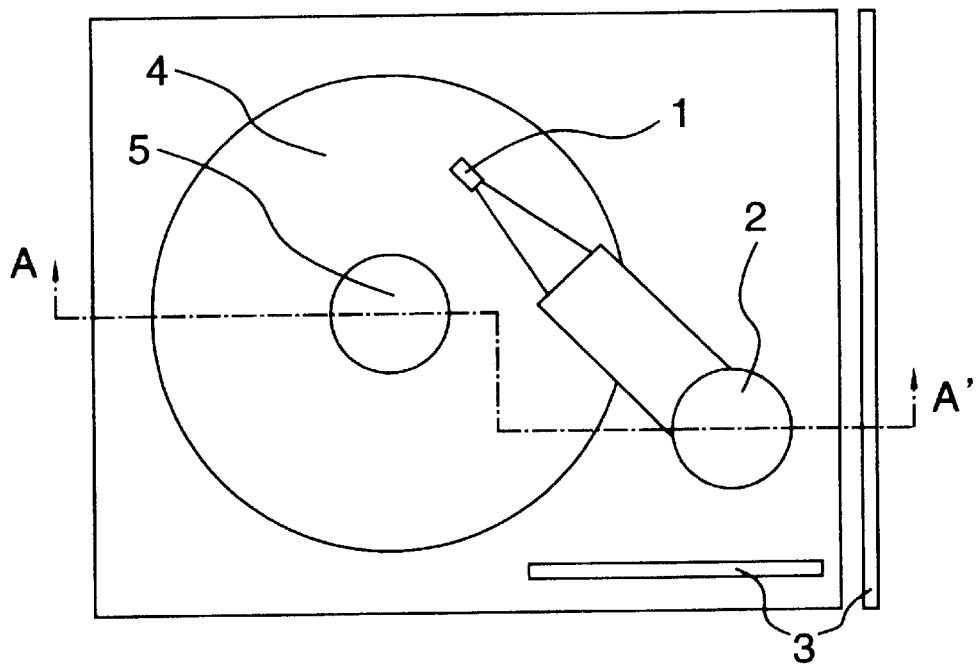
FIG. 3A is a schematic plan view showing a magnetic recording system according to an embodiment of the present invention.
Figure 3B:
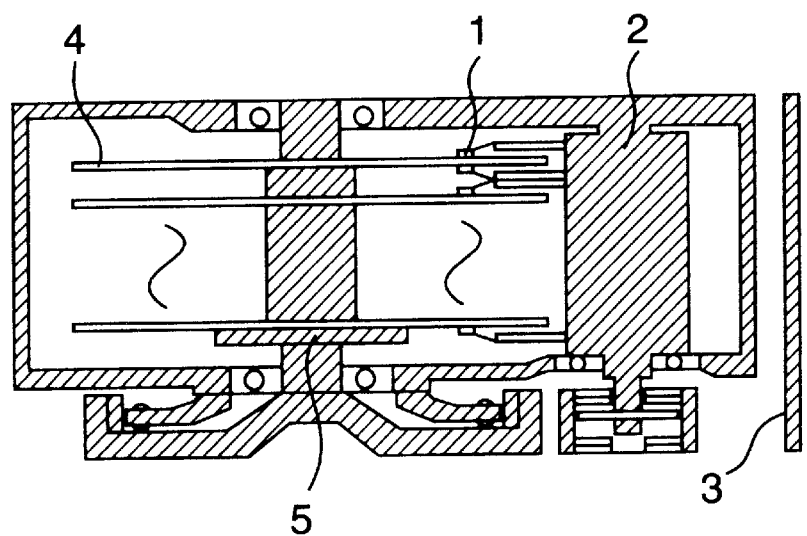
FIG. 3B is a cross-sectional view taken along the line A—A in FIG. 3A.

The inventive example 1 according to the present invention will be described below with reference to FIGS. 3A, 3B and FIGS. 4 and 5. FIG. 3A is a schematic plan view of a magnetic recording system according to this inventive example 1, and FIG. 3B is a cross-sectional view taken along the line A—A in FIG. 3A. This magnetic recording system is a magnetic recording system having a well-known structure comprising a magnetic head 1, a head access system 2 for driving the magnetic head 1, a write/read signal processing means 3 for such magnetic head 1, a magnetic recording medium 4 and a driving unit 5 for rotating the magnetic recording medium 4.

Figure 4:
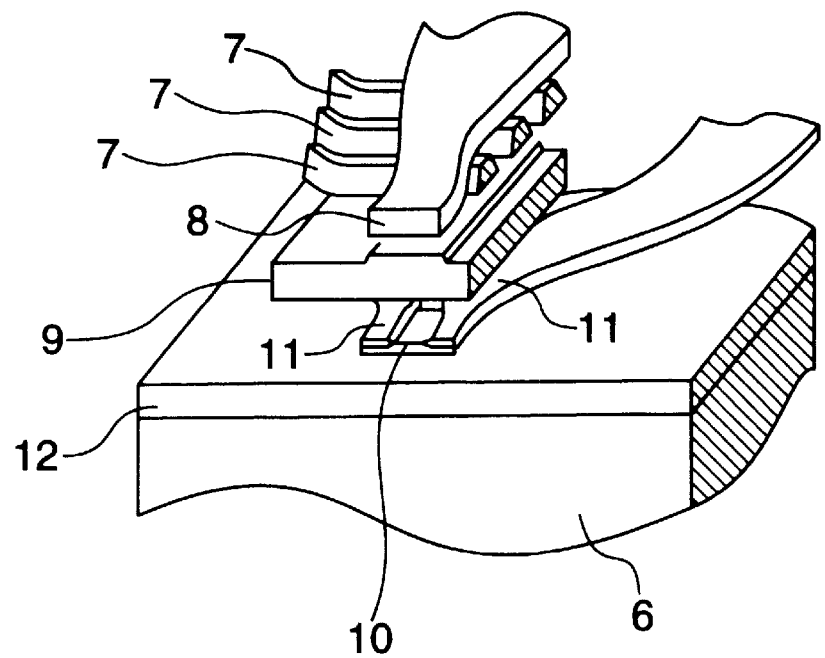
FIG. 4 is a perspective view showing an example of a sectional structure of a magnetic head used in a magnetic recording system according to the present invent ion.

FIG. 4 shows a structure of the above-mentioned magnetic head 1. As shown in FIG. 4, this magnetic head 1 is a combination type magnetic head comprising a write inductive head and a read magnetoresistive head formed on a substrate 6. The write head comprises an upper magnetic pole 8 and a lower magnetic pole/upper shield layer 9 across a coil 7. A thickness of a gap layer between the upper and lower magnetic poles 8 and 9 was selected to be 0.3 $\mu$m. Also, the coil 7 was made of Cu having a thickness of 3 $\mu$m. The above-mentioned read head comprises a magnetoresistive sensor 10 and an electrode pattern 11 disposed across the magnetoresistive sensor 10. The magnetoresistive sensor 10 is sandwiched between the lower magnetic pole/upper shield layer 9 and a lower shield layer 12 both of which have the same thickness of 1 $\mu$m. A distance between the upper shield layer 9 and the lower shield layer 12 is selected to be 0.25 $\mu$m.

Figure 5:
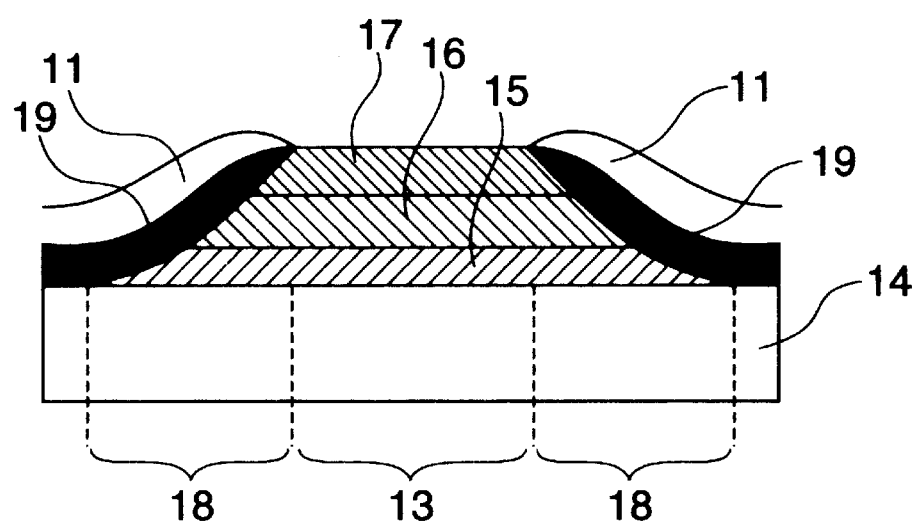
FIG. 5 is a schematic diagram showing an example of a sectional structure of a magnetoresistive sensor unit of a magnetic head used in a magnetic recording system according to the present invention.

FIG. 5 shows a sectional structure of the magnetoresistive sensor 10. As shown in FIG. 5, a signal sensing region 13 of the magnetoresistive sensor 10 is formed of a portion in which a transversal biasing layer 15, a separating layer and a magnetoresistive ferromagnetic layer 17 are sequentially deposited on an oxide Al gap layer 14. As the magnetoresistive ferromagnetic layer 17, there was used an NiFe alloy having a thickness of 20 nm. Although the transversal biasing layer 15 is made of NiFeNb alloy having a thickness of 25 nm, the present invention is not limited thereto, and the transversal biasing layer 15 may be made of any of ferromagnetic alloys so long as a ferromagnetic alloy has an excellent soft magnetic property. The transversal biasing layer 15 is magnetized in the in-plane direction (transversal direction) perpendicular to a sense current by a magnetic field generated by the sense current flowing through the magnetoresistive ferro-magnetic layer 17, and applies a transversal bias magnetic field to the magnetoresistive ferromagnetic layer 17. Thus, there is obtained a magnetic sensor which demonstrates a linear read output relative to a leakage field from the magnetic recording medium. The separating layer 16 for preventing the sense current flowed from the magnetoresistive ferromagnetic layer 17 from being distributed was made of Ta having a relatively, high electric resistance, and the film thickness thereof was selected to be 5 nm.

As shown in FIG. 5, tapered portions 18 manufactured as tapered shapes are formed on respective ends of the signal sensing region 13. The tapered portions 18 comprise permanent magnet layers 19 for making the magnetoresistive ferromagnetic layer 17 become a single magnetic domain and a pair of electrodes 11 formed on the permanent magnet layers 19 for deriving signals. Since it is required that the permanent magnet layers 19 should have a large coercivity and that the magnetization directions thereof should be difficult to change, they are made of CoCr alloy, CoCrPt alloy or the like.

Figure 6:
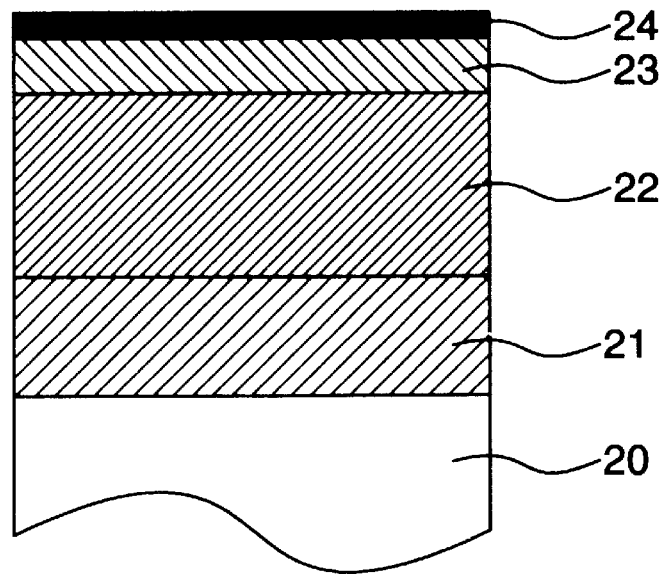
FIG. 6 is a schematic diagram showing an example of a sectional structure of a magnetic recording medium according to the present invention.

FIG. 6 shows the layer structure of the magnetic recording medium according to this inventive example 1. As a substrate 20, there was used a super-smooth Al alloy substrate (hereinafter referred to as "Al substrate") which was coated with an NiP plating. On the substrate 20, there were sequentially deposited a Cr-20 at % Ti alloy underlayer 21 having a thickness ranging from 3 to 20 nm, a Co-21 at % Cr-10 at % Pt alloy magnetic layer 22 having a thickness of 20 nm and a carbon protective film 23 having a thickness of 10 nm by DC magnetron sputtering. An Ar gas was used as a sputtering gas, and a gas pressure used when each layer was deposited was changed in a range of from 5 to 20 mTorr. Also, a lubricant layer 24 was made of such a material which results from diluting a perfluoroalkyl-polyether-based material by a fluorocarbon material.

TABLE 1

| Media | Coercivity (kOe) | Normalized Media Noise ($\mu$Vrms · $\mu$m$^{1/2}$/$\mu$Vpp) | Ku · v/kT |
|---|---|---|---|
| 1A | 2.76 | 0.0197 | 146 |
| 1B | 2.67 | 0.0175 | 104 |
| 1C | 2.48 | 0.0159 | 77 |
| 1D | 2.25 | 0.0148 | 66 |
| 1E | 1.61 | 0.0144 | 55 |

The above table 1 shows values of coercivities, normalized media noises and Ku·v/kT of the magnetic recording media manufactured under the above-mentioned respective conditions. Here, the normalized media noise kNd is a value which results from normalizing a media noise measured under the condition that a linear recording density is 220 kFCI and a head flying height is 50 nm by square roots of an isolation read output and a track width. Also, Ku·v/kT is a value calculated by using an anisotropic magnetic field Hk obtained by measuring a rotation history loss at a room temperature, an anisotropic constant Ku obtained from a saturated magnetization Ms under the condition of Ku=Hk·Ms/2 and a volume v of a magnetic crystal grain. The volume v is calculated from the average grain size and the film thickness of the magnetic layer. Reference letters k and T represent the Boltzmann constant and the absolute temperature, respectively.

Figure 7:
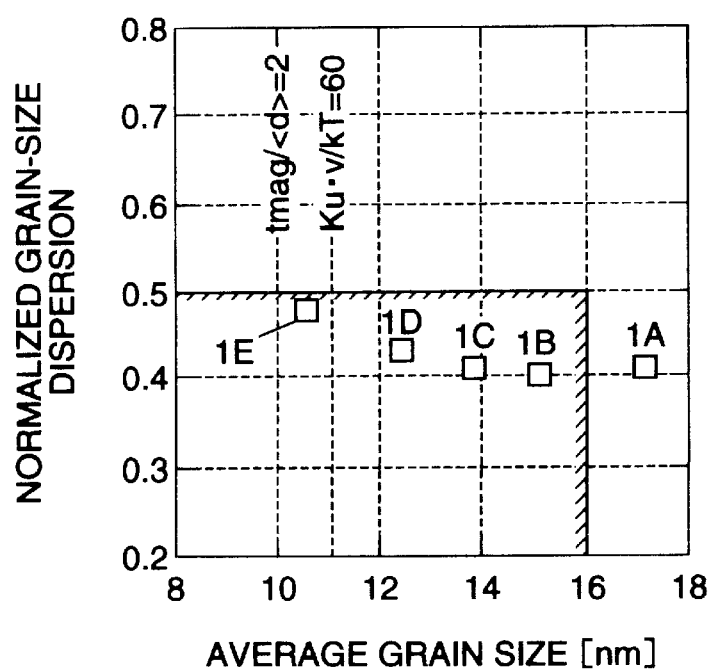
FIG. 7 is a map diagram showing a relationship between an average grain size and a normalized grain-size dispersion of a magnetic crystal grain in a magnetic recording medium according to an embodiment of the present invention.

Having observed the magnetic layers of these magnetic recording media under the transmission electron microscope (TEM), it is to be noted that the magnetic layer has an acicular structure. Further, it is to be noted that a distinct segregation phase between the magnetic crystal grains was not recognized. FIG. 7 shows values of the average grain size and the normalized grain size which were obtained from the thus obtained TEM image (lattice image) by the above-mentioned method. In any of the magnetic recording media, the normalized grain-size dispersion was less than 0.5, and a ratio between the film thickness of the magnetic layer and the average grain size was less than 2. As shown on the above-mentioned table 1, any of the a-magnetic recording media B to D according to this inventive example 1 demonstrates sufficient magnetic properties in which the normalized media noise is less than 0.018 and the coercivity is greater than 2 kOe, which can sufficiently realize a high recording density greater than 2 gigabits per one square inches. On the other hand, the magnetic recording medium A the average grain size of which is greater than 16 nm demonstrates a considerably large media noise. As described before, a distinct grain boundary phase was not found in any one of the magnetic recording media according to this inventive example 1. Further, an X-ray diffraction pattern of each magnetic recording medium demonstrates only (11.0)-diffraction peak from the magnetic layer and (200)-diffraction peak from the underlayer so that a large difference is not discovered in the crystallographic orientation. From this aspect, it may be considered that the magnetic recording medium A has a large media noise due to the influence of the crystal grain size. Therefore, it is to be understood that the average grain size should be less than 16 nm in order to realize a high recording density which is greater than 2 gigabits per one square inches.

Figure 8:
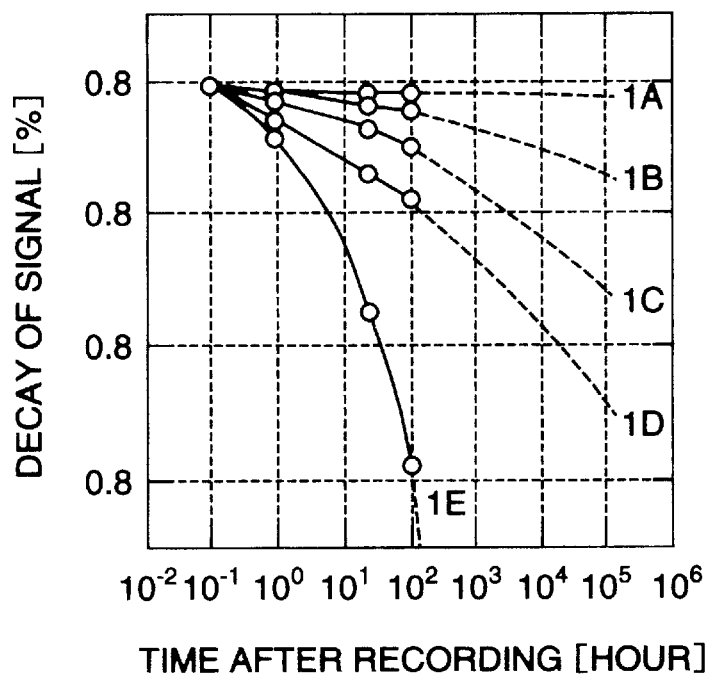
FIG. 8 is a graph graphing measured results of a decay of signal versus a time in a magnetic recording medium according to an embodiment of the present invention.

Further, in order to examine the influence of the thermal fluctuation which is one of the problems that should be solved to realize the high recording density, a decay of signal relative to a time was measured. FIG. 8 shows measured results of a decay of signal. Here, the decay of signal is a value $\Delta$S/S0 which results from normalizing a difference $\Delta$S (=S1–S0) between a read output S1 measured after a constant time at a room temperature and a read output measured immediately after the recording by S0, and may be considered as a value which indicates a stability of a magnetic recording medium against a thermal fluctuation. A linear recording density obtained at that time was selected to be 220 kFCI. A decay of signal after 96 hours that any one of the magnetic recording media A to D according to this inventive example 1 demonstrated was fallen within 2%. In this case, a decay of signal obtained by the extrapolation up to 10 years later (8.76×10$^4$ hours later) is estimated as under 5%, and it may be considered that the magnetic recording media A to D according to this inventive example 1 are sufficiently suitable for a long time recording. On the other hand, the magnetic recording medium E in which Ku·v/kT is less than 60 has a large decay of signal, which demonstrates that its thermal stability is not sufficient. Therefore, in order to obtain a sufficient thermal stability, it is necessary that Ku·v/kT should be greater than 60.

Having executed a CSS test (contact·start·stop test) on a magnetic recording system in which the magnetic recording media A to E according to this inventive example 1 are incorporated together with the above-mentioned magnetic head, it is to be understood that a coefficient of friction obtained after the CSS 4-test had been effected 30000 times was less than 0.3. Moreover, a bit error rate obtained after a head seek test from the inner periphery to the outer periphery of the magnetic recording medium had been executed 50000 times was less than 10 bits/plane, and the MTBF (mean time between failure) longer than 300000 hours could be achieved.

<Inventive Example 2>

There were manufactured magnetic recording media in which a first underlayer was made of Cr having a thickness of 10 nm, a second underlayer was made of (Cr-15 Bt % Ti)-$_x$at % B alloy having a thickness ranging from 5 to 20 nm and the B content x was changed in a range of from 0 to 10 at %. A magnetic layer thereof was made of Co-18 at % Cr-14 at % Pt-2 at % Ta alloy having a thickness of 18 nm.

Magnetic properties of the respective magnetic recording media are demonstrated on the following table 2.

TABLE 2

| Media | Coercivity (kOe) | Normalized media noise ($\mu$Vrms · $\mu$m$^{1/2}$/$\mu$Vpp) | Decay of signal (%) | Ku · v/kT |
|---|---|---|---|---|
| 2A | 2.81 | 0.0161 | −0.7 | 145 |
| 2B | 2.25 | 0.0238 | −4.2 | 115 |
| 2C | 2.59 | 0.0152 | −1.3 | 95 |
| 2D | 2.11 | 0.0215 | −5.6 | 79 |
| 2E | 2.63 | 0.0121 | −0.7 | 68 |
| 2F | 2.25 | 0.0145 | −1.9 | 64 |

Figure 9:
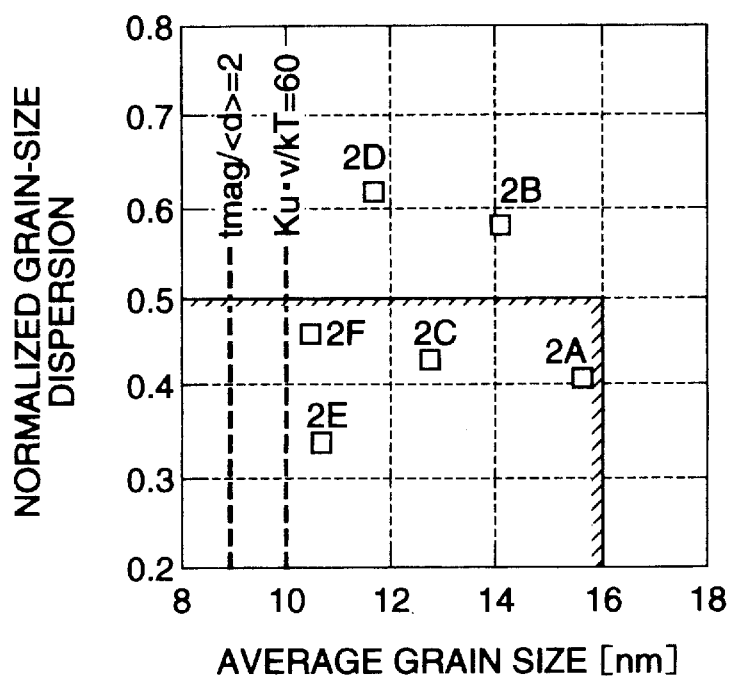
FIG. 9 is a map diagram showing a relationship between an average grain size and a normalized grain-size dispersion of a magnetic crystal grain in a magnetic recording medium according to an embodiment of the present invention.

The normalized media noise and the decay of signal are those measured under the conditions similar to those of the inventive example 1, and the decay of signal is the value of the decay of signal after 96 hours. Having calculated the average grain size and the normalized grain-size dispersion from the TEM image (lattice image), it is to be noted that the average grain size of any magnetic recording medium was less than 16 nm and the ratio of the film thickness of the magnetic layer relative to the average grain size was less than 2 as shown in FIG. 9. Although the average grain size of the magnetic recording media 2B and 2D each of which has the normalized grain-size dispersion greater than 0.5 fall within the region in which an inequality of Ku·v/kT>60 is satisfied, the normalized media noises thereof are remarkably high. Also, the decays of signal of these magnetic recording media 2B and 2D are as large as −4.2% and −5.5%, respectively. In the TEM image, a distinct grain boundary phase was not discovered from any of the magnetic recording media 2B and 2D, and it may be considered that the segregated states of these magnetic recording media 2B and 2D are not largely different from each other. A study of measured results of the X-ray diffraction reveals that the first and second underlayers of any magnetic recording medium demonstrated only (200)-diffraction peak of a body-centered cubic structure and that the magnetic layers thereof demonstrated only(11.0)-diffraction peak of a hexagonal closed packed lattice structure. Since the segregated states and the crystallographic orientation of the magnetic recording media according to this inventive example 2 are not largely different from each other as described above, the differences of the aforementioned magnetic properties are caused mainly by a uniformity of magnetic crystal grain. Therefore, it is to be appreciated that the uniform magnetic recording medium in which the normalized grain-size dispersion is less than 0.5 should be manufactured in order to obtain the sufficient magnetic properties and the sufficient thermal stability for the high density recording higher than 2 gigabits per one square inches. Further, although the magnetic recording medium E in which the normalized grain-size dispersion is less than 0.4 has substantially the same average grain size as that of the magnetic recording medium F, the magnetic recording medium E has a considerably low media noise, and the decay of signal thereof also is low. Therefore, it is clear that to lower the normalized grain-size dispersion up to less than 0.4 is very effective in lowering the media noise much more and in improving a thermal stability much more.

Incidentally, while all films are deposited by DC sputtering in the inventive example 2, the inventive example 2 is not limited thereto, and other methods such as ion beam sputtering and ECR sputtering may also be employed with similar effects being achieved.

In the magnetic recording system having the arrangement similar to that of the magnetic recording system according to the inventive example 1, there was manufactured a magnetic recording medium in which a magnetic layer was made of Fe—Sm—N alloy.

Specifically, a CrB underlayer having a thickness of 10 nm was deposited on a chemically-strengthened soda lime glass substrate, and the B content in the CrB underlayer was changed in a range of from 0 to 10 at %. After the substrate was heated up to 300° C. by a lamp heater, there were formed a magnetic layer having a thickness of 12 nm made of FeSmN alloy and a carbon protective film, in that order. A magnetic target was made of Ee-87 at % Sm-2 at % N alloy. A mixed gas in which 3% of nitrogen was added to the Ar gas was used as a sputtering gas, and a gas pressure was selected in a range of from 5 to 20 mTorr.

A study of results observed under the TEM reveals that the structure of the magnetic layer of each magnetic recording medium is the acicular structure similar to that of the inventive example 1 and that magnetic particles are amorphous and surrounded by the crystalline segregated phase.

Figure 10:
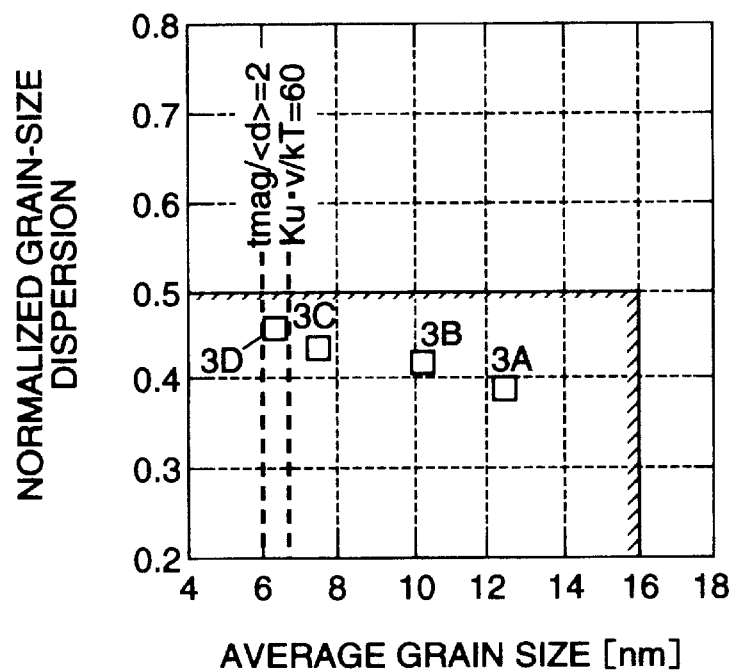
FIG. 10 is a map diagram showing a relationship between an average grain size and a normalized grain-size dispersion of a magnetic crystal grain in a magnetic recording medium according to an embodiment of the present invention.

The following table 3 indicates the magnetic properties of the respective resultant magnetic recording media, and FIG. 10 shows average grain sizes and normalized grain-size dispersions of amorphous magnetic particles which were estimated by a method similar to that of the inventive example 1.

TABLE 3

| Media | Coercivity (kOe) | Normalized media noise ($\mu$Vrms · $\mu$m$^{1/2}$/$\mu$Vpp) | Decay of signal (%) | Ku · v/kT |
|---|---|---|---|---|
| 3A | 2.89 | 0.0176 | −0.1 | 131 |
| 3B | 2.74 | 0.0166 | −0.3 | 99 |
| 3C | 2.36 | 0.0151 | −0.8 | 71 |
| 3D | 1.81 | 0.0141 | −7.7 | 56 |

The average grain sizes of these magnetic recording media are all less than 16 nm and the normalized grain-size dispersions of these magnetic recording media are all less than 0.5. Also, the film thickness of the magnetic layer relative to the average grain size is less than 2. Further, since the magnetic layer is made of rare-earth alloy having a crystal magnetic anisotropy, even a smaller grain size is able to obtain Ku·v/kT greater than 60 as compared with the magnetic recording media of the inventive examples 1 and 2. The magnetic recording media 3A, 3B and 3C in which Ku·v/kT is greater than 60 have a high coercivity higher than 2 kOe and a low normalized media noise less than 0.018, and also may demonstrate a decay of signal after 96 hours of less than 2%. Thus, the magnetic recording media 3A, 3B and 3C may demonstrate sufficient magnetic properties for realizing a high recording density greater than 2 gigabits per one square inches. However, since the magnetic recording medium 3D has ku·v/kT as low as 56, its decay of signal is large, and is inferior to the magnetic recording media 3A, 3B and 3C in thermal stability. Therefore, herein, it is made clear that Ku·v/kT should be greater than 60 in order to obtain a sufficiently-high stability against a thermal fluctuation.

Having evaluated read/write characteristics by using the magnetic recording system according to this inventive example under the conditions that a head flying height was 30 nm, a linear recording density was 220 kFCI and a track density was 10.5 kTPI, there was obtained EL system S/N of 1.6. Also, information of 2 gigabits per one square inches could be written and read by modulating an input signal to the magnetic head in an 8–9 (eight-to-nine) modulation fashion and demodulating an output signal by a maximum likelihood signal processing. In addition, the bit error rate obtained after the head seek test from the inner periphery to the outer periphery had been executed 50000 times was 10 bits/plane and the MTBF of 200000 hours could be achieved.

<Inventive Example 4>

Figure 11:
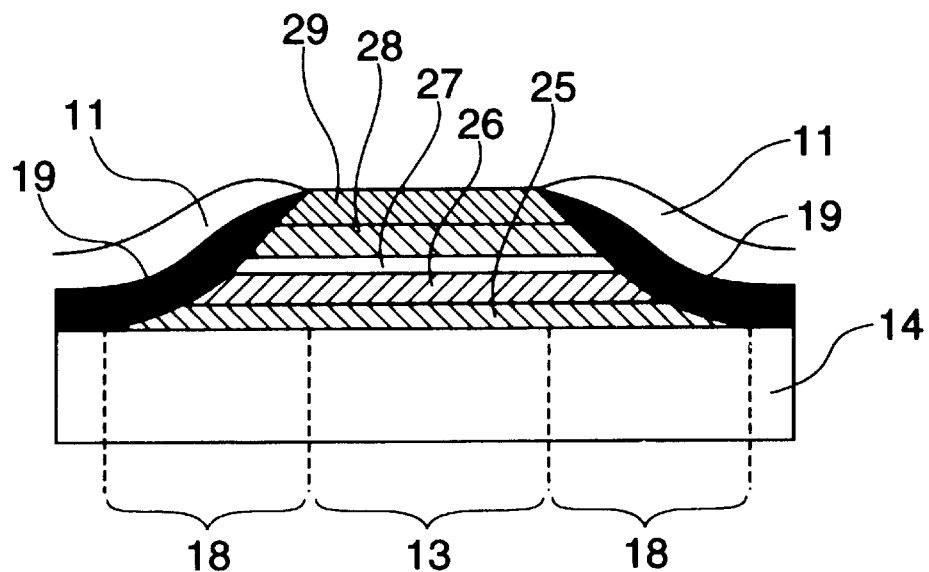
FIG. 11 is a perspective view showing an example of a sectional structure of a magnetic head used in a magnetic recording system according to the present invention.

In a magnetic recording system similar to that of the inventive example 1, a magnetic sensor shown in FIG. 11 was used as a read magnetic head.

As shown in FIG. 11, this magnetic sensor has a structure in which a Ta buffer layer 25 having a thickness of 5 nm, a first magnetic layer 26 having a thickness of 7 nm, a Cu intermediate layer 27 having a thickness of 1.5 nm, a second magnetic layer 28 having a thickness of 3 nm and an Fe-50 at % Mn antiferromagnetic alloy layer 29 having a thickness of 10 nm were formed on a gap layer 14, in that order. The first magnetic layer 26 was made of Ni-20 at % Fe alloy, and the second magnetic Layer 28 was made of Co. The magnetization of the second magnetic layer 28 was fixed to one direction by an exchange magnetic field from the antiferromagnetic layer 29. On the other hand, since the magnetization direction of the first magnetic layer 26 adjoining the second magnetic layer 28 through the non-magnetic layer 27 is changed by a leakage field from the magnetic recording medium, there occurs a resistance change. The resistance change caused as the magnetization directions of the two magnetic layers are changed relatively is referred to as "spin valve effect", and this inventive example 4 has used a spin valve-type magnetic head, which makes effective use of this spin valve effect, as a read head. The tapered portions 18 are the same as those of the magnetic sensor shown in the inventive example 1.

There was used a magnetic recording medium in which a first underlayer made of Co-30 at % Cr-10 at % Zr alloy, a second underlayer made of Cr-15 at % Mo alloy and a magnetic layer made of Co-20 at % Cr-12 at % Pt-2 at % Ta were sequentially deposited on a glass substrate. The film thicknesses of the underlayers and the film deposition conditions were all made constant but only the film thickness of the magnetic layer was changed at the interval of 4 nm in a range of from 16 to 36 nm.

TABLE 4

| Media | Coercivity (kOe) | Normalized media noise ($\mu$Vrms · $\mu m^{1/2}$/$\mu$Vpp) | Decay of signal (%) | Ku · v/kT |
| --- | --- | --- | --- | --- |
| 4A | 1.68 | 0.0235 | −0.5 | 245 |
| 4B | 2.1 | 0.0183 | −0.7 | 186 |
| 4C | 2.45 | 0.0154 | −0.9 | 157 |
| 4D | 2.68 | 0.0146 | −1.3 | 98 |
| 4E | 2.46 | 0.0141 | −1.8 | 64 |

Figure 12:
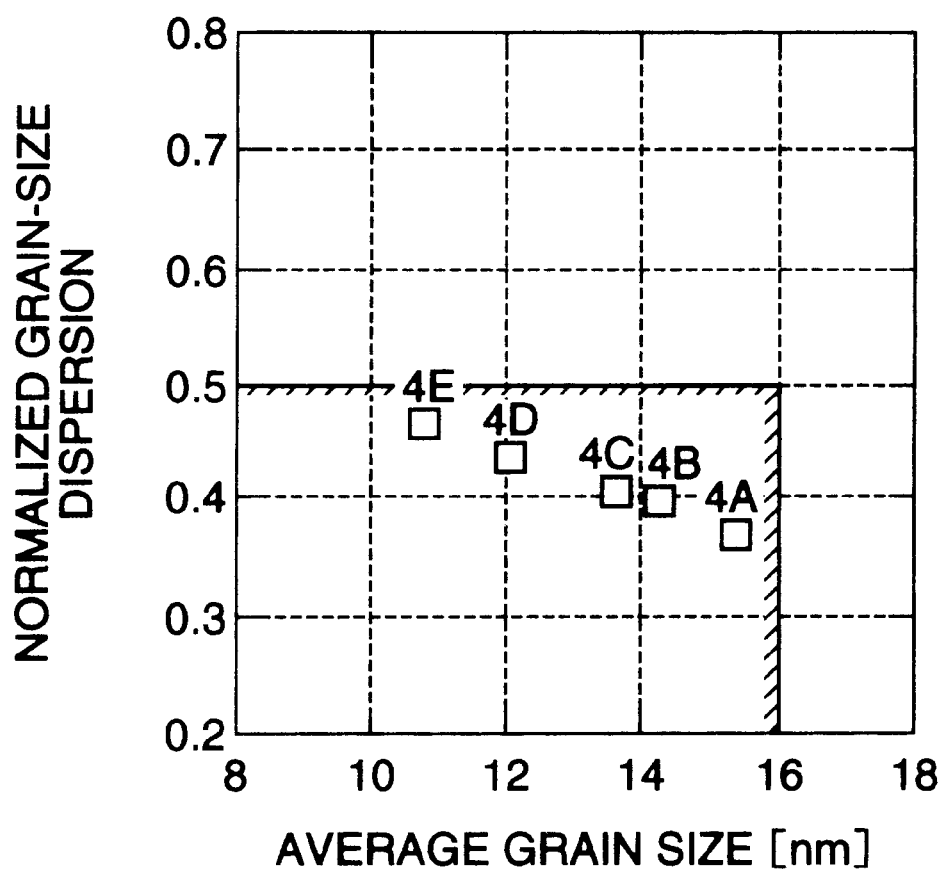
FIG. 12 is a map diagram showing a relationship between an average grain size and a normalized grain-size dispersion of a magnetic crystal grain in a magnetic recording medium according to an embodiment of the present invention.

As shown on the above table 4, any one of the magnetic recording media 4A to 4E had Ku·v/kT of greater than 60. Also, the average grain size was less than 16 nm, and the normalized grain-size dispersion was less than 0.5 (see FIG. 12). Incidentally, the film thickness of the magnetic layer of the magnetic recording medium A was 36 nm, and the magnetic layers of the magnetic recording media B, C and D were decreased by every 4 nm. The film thickness of the magnetic layer of the magnetic recording medium E was 16 nm. Both of the magnetic recording media A and B had a coercivity less than 2.4 kOe and a normalized media noise higher than 0.018 obtained when information was recorded at the linear recording density of 260 kFCI. These magnetic recording media A and B are not sufficient for a high recording density of greater than 4 gigabits per one square inches. The reason for this may be considered such that, since the ratios of the film thicknesses of the magnetic layers relative to the average grain sizes of both the magnetic recording media A and B were larger than 2, i.e. 2.2 and 2.1, a shape magnetic anisotropy in the direction perpendicular to the film was increased. Therefore, in order to obtain satisfactory magnetic properties, it is preferable that the film thickness of the magnetic layer should be made less than twice the average grain size.

After a lubricant was coated on the magnetic recording media according to this inventive example 4, the resultant magnetic recording media were assembled in the system using the above-mentioned head. Then, having examined read/write characteristics under the conditions that a linear recording density was 260 kFCI and a track density was 16.5 kTPI, there was obtained a high system S/N of 1.8. Also, information of 4 gigabits per one square inches could be written and read by modulating an input signal to the magnetic head in an 16–17 (sixteen-to-seventeen) modulation fashion and demodulating an output signal by a maximum likelihood signal processing. In addition, the bit error rate obtained after the head seek test from the inner periphery to the outer periphery had been executed 50000 times was 10 bits/plane and the MTBF which is longer than 300000 hours could be achieved.

<Inventive Example 5>

Respective layers were arranged similarly to those of the magnetic recording media shown in the inventive example 1, and a magnetic layer was formed of a bilayer structure. An Al—Mg alloy substrate having an outer diameter of 95 mm $\phi$ the surface of which was plated by NiP was used as a substrate. A Cr-15 at % Ti alloy layer having a thickness of 10 nm, a Co-22 at % Pt alloy layer having a thickness of x nm (x=0 to 14), a Co-22 at % Cr-10 at % Pt alloy layer having a thickness of (14−x) nm and a carbon layer having a thickness of 10 nm were continuously deposited on the substrate by DC magnetron sputtering as an underlayer, a first magnetic layer, a second magnetic layer and a protective layer, respectively. Incidentally, the magnetic layers obtained when x=0 and x=14 are equivalent to those obtained by a Co-22 at % Cr-10 at % Pt and Co-22 at % Cr-12 at % Pt single-layer magnetic layers having a thickness of 14 nm, respectively.

Figure 13A:
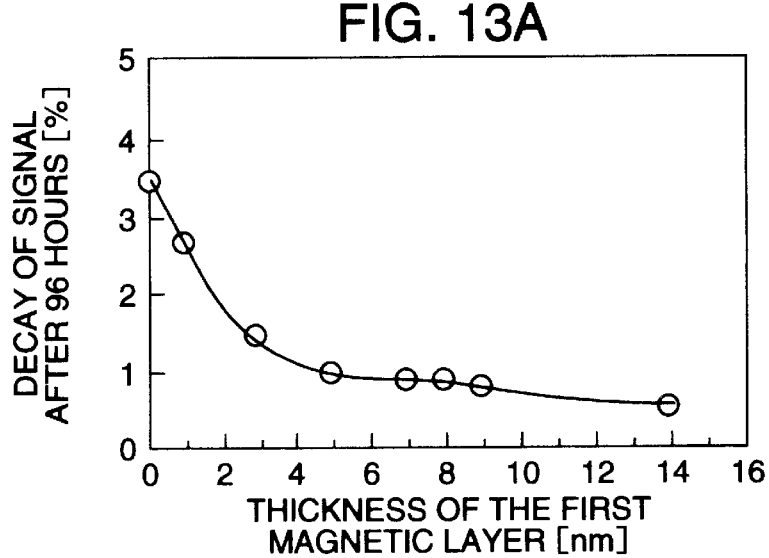
FIG. 13A is a graph showing a relationship between a film thickness of a first magnetic layer and a decay of signal.
Figure 13B:
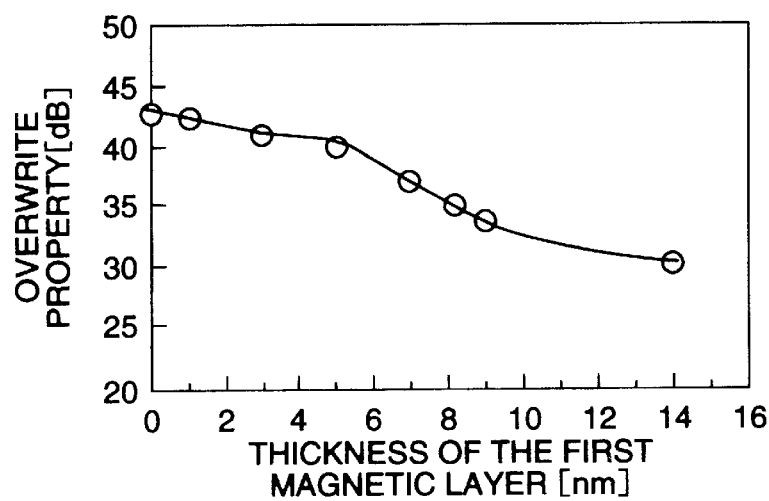
FIG. 13B is a graph showing a relationship between a film thickness of a first magnetic layer and overwrite properties.

FIG. 13A shows a relationship between the film thickness of the first magnetic layer and a decay of signal after 96 hours at a linear recording density of 225 kFCI, and FIG. 13B shows a relationship between the film thickness of the first magnetic layer and an overwrite property, respectively. Even when the film thickness of the first magnetic layer was as thin as 1 nm, it was confirmed that a decay of read output could be reducer. The reason for this may be considered such that, when the Pt content in the first magnetic layer is increased much more, Ku of excessively-small particles in the initial deposition portion can be improved, which can comparatively increase the value of Ku·v. Further, when the film thickness became larger than 3 nm, as compared with the case in which the first magnetic layer was not used, a decay of signal became very small, i.e. less than ½. Thus, the influence of the thermal fluctuation could be suppressed sufficiently. On the other hand, the overwrite property demonstrated a satisfactory overwrite property of greater than 35 dB which is satisfactory in actual practice until the film thickness of the first magnetic layer becomes 8 nm. In the region in which the film thickness of the first magnetic layer increased much more, the overwrite property was deteriorated progressively. Further, in the region in which the film thickness of the first magnetic layer was less than 5 nm, there was obtained a satisfactory overwrite property, in particular, overwrite property higher than 40 dB. From the aforesaid aspects, it is clear that, in order to suppress the influence of the thermal fluctuation thereby to obtain a satisfactory overwrite property, it is effective to form the magnetic layer as the bilayer structure in which the first magnetic layer is formed of a magnetic layer having a high Pt content. Although the film thickness of the first magnetic layer should preferably be selected between 1 nm and 8 nm, the film thickness of the first magnetic layer should preferably be selected to be less than 5 nm in order to obtain, in particular, a satisfactory overwrite property.

<Inventive Example 6>

Respective layers were arranged similarly to those of the magnetic recording media shown in the inventive example 1. An Al—Mg alloy substrate having an outer diameter of 95 mm φ the surface of which was plated by NiP was used as a substrate. A Cr-15 at % Ti alloy layer having a thickness of 10 nm, a Co—Cr-11 at % Pt alloy layer having a thickness of 3 nm in which a Cr content is changed in a range of from 16 at % to 23 at %, a Co-22 at: % Cr-10 at % Pt alloy layer having a thickness of 14 nm and a carbon layer having a thickness of 10 nm were continuously deposited on the substrate by DC magnetron sputtering as an underlayer, a first magnetic layer, a second magnetic layer and a protective layer, respectively.

Figure 14:
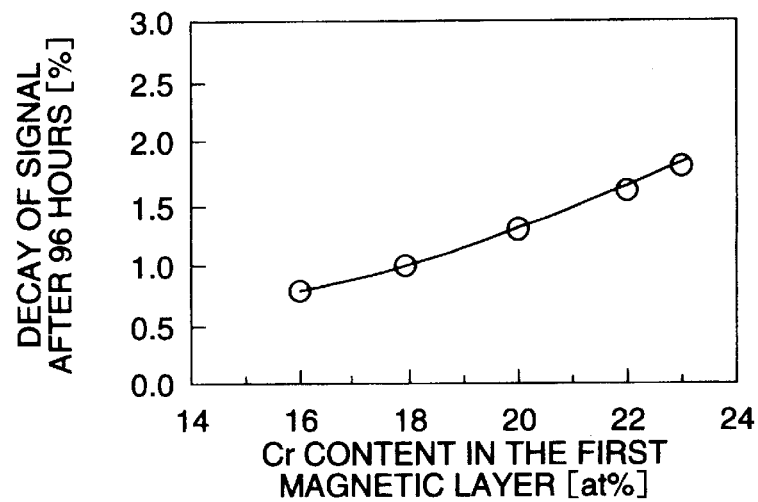
FIG. 14 is a graph showing a relationship between a Cr content in a first magnetic layer and a decay of signal.

FIG. 14 shows a relationship between a Cr content in the first magnetic layer and a decay of signal after 96 hours at a linear recording density of 225 kFCI. A decay of read output was decreased as the Cr content in the first magnetic layer was lowered. The reason for this may be considered such that, when the Cr content is lowered, excessively-small particles in the initial deposition portion of the magnetic layer are combined magnetically so that the substantial magnetization inversion size becomes larger than the particle size. As described above, it is possible to suppress the influence of the thermal fluctuation by lowering the Cr content and by increasing the magnetization inversion size without increasing the Pt content in the first magnetic layer so much. However, if the Cr content is lowered excessively, then the magnetization inversion size becomes larger than is necessary with the result that a media noise is unavoidably increased. Therefore, it is necessary to select a proper Cr content together with a film deposition process such as a substrate temperature for promoting a segregation of a non-magnetic Cr.

The resultant magnetic recording media according to this inventive example 6 in which the composition of the first magnetic layer was Co-18 at % Cr-11 at % Pt were assembled in the system using the magnetic recording system similar to the inventive example 4. Then, having examined read/write characteristics of the above-mentioned magnetic recording media under the conditions that a head flying height was 30 nm, a linear recording density was 260 kFCI and a track density was 17.5 kTPI, there was obtained a high system S/N of 1.6. Also, information could be written and read at a recording density of 4 gigabits per one square inches in a temperature range from 10° C. to 50° C. by modulating an input signal to the magnetic head in the 8–9 modulation fashion. In addition, the bit error rate obtained after the head seek test from the inner periphery to the outer periphery had been executed 50000 times was less than 10 bits/plane and the MTBF of 300000 hours could be achieved.

The magnetic recording medium according to the present invention is able to achieve the effects for reducing the media noise and for improving the stability against the thermal fluctuation. Accordingly, by using the magnetic recording medium and the magnetoresistive head according to the present invention, it becomes possible to realize a magnetic recording system having a recording density of 2 gigabits per one square inches and the MTBF of longer than 300000 hours.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. In a magnetic recording medium having a magnetic,, layer deposited on a substrate through an undertaker of a single layer of a multilayer, said magnetic recording medium characterized in that said magnetic layer is composed of crystalline or amorphous magnetic particles having an acicular structure, an average grain size <d> measured within a plane substantially parallel to a substrate surface of said magnetic particles is less than 16 nm, a ratio Δd/<d> between a grain-size dispersion width Δd and said average grain <d> is less than 0.5 and that a film thickness of said magnetic layer is less than twice said average grain size <d>.

2. A magnetic recording medium a s claimed in claim 1, wherein said ratio Δd/<d> between said grain-size dispersion width Δd and said average grain size <d> is less than 0.4.

3. A magnetic recording medium as claimed in claim 1, wherein a value Ku·v/krT which results from dividing a product of a magnetic anisotropy constant Ku and a volume v of a magnetic particle in said magnetic layer by a product of a Boltzmann constant k and an absolute temperature T is greater than 60.

4. A magnetic recording medium as claimed in claim 1, wherein said magnetic layer is made of a magnetic alloy having a hexagonal closed packed lattice structure, a c-axis of said magnetic alloy is substantially faced to the in-plane direction of said substrate and said magnetic layer is deposited on an underlayer which is mainly made of a Cr having a body-centered cubic structure the (100)-plane of which is oriented substantially parallel to the substrate surface.

5. A magnetic recording medium as claimed in claim 1, wherein said magnetic layer is made of a magnetic alloy having a hexagonal closed packed lattice structure using Co as a main component and said magnetic alloy contains 15 to 23 at % Cr and 6 to 20 at % Pt.

6. In a magnetic recording system comprising a magnetic recording medium, a head access system for driving staid magnetic recording medium in the recording direction, a magnetic head composed of a write unit and a read unit, means for moving said magnetic head relative to said magnetic recording medium and read/write signal processing means for writing a signal in said magnetic head and reading an output signal from said magnetic head, said magnetic recording system characterized in that said read unit of said magnetic head is composed of a magnetoresistive head and said magnetic recording medium is composed of said magnetic recording as claimed in claim 1.

7. A magnetic recording system as claimed in claim 6, wherein a magnetoresistive sensor unit of said magnetoresistive head is formed between two shield layers made of a soft magnetic material spaced apart by a distance less than 0.30 μm, a product Br×t of a thickness t of said magnetic film and a residual magnetic flux density Br measured when a magnetic field is applied to the direction in which said magnetic head is transported relative to said magnetic recording medium upon recording is greater than 40 Gauss·micron and smaller than 140 Gauss·micron, and further a coercivity of said magnetic recording medium measured when a magnetic filed is applied to the same direction as the direction in which said magnetic field is applied is greater than 2 kOe.

8. A magnetic recording system as claimed in claim 6, wherein said magnetoresistive head is comprised of a magnetoresistive sensor including a plurality of conductive magnetic layers capable of generating a large resistance change by relatively changing their magnetization directions with an application of an external magnetic field and conductive non-magnetic layers disposed among said conductive magnetic layers.

* * * * *

UNITED STATES PATENT AND TRADEMARK OFFICE
CERTIFICATE OF CORRECTION

PATENT NO. : 6,080,476

DATED : June 27, 2000

INVENTOR(S) : KANBE et al

It is certified that error appears in the above-identified patent and that said Letters Patent is hereby corrected as shown below:

| Column | Line | |
|---|---|---|
| 1 | 38 | Change "Et" to -- a --. |
| 2 | 10 | Change "ay" to -- may --. |
| 2 | 37 | Change "Large" to -- large --. |
| 3 | 4 | After "result," delete "a". |
| 3 | 10 | After "canceled" insert -- out --. |
| 3 | 11 | Delete "out". |
| 4 | 48 | After "uniform" insert -- , --. |

UNITED STATES PATENT AND TRADEMARK OFFICE
CERTIFICATE OF CORRECTION

PATENT NO. : 6,080,476
DATED : June 27, 2000
INVENTOR(S) : KANBE et al

It is certified that error appears in the above-identified patent and that said Letters Patent is hereby corrected as shown below:

| Column | Line | |
|---|---|---|
| 5 | 2 | After "greater" delete ":". |
| 5 | 54 | Change "Layers" to -- layers --. |
| 6 | 13 | Change "perfluordalkyl" to --perfluoroalkyl --. |
| 6 | 46 | Change "taco" to -- two --. |
| 7 | 14 | Change "invent ion" to -- invention --. |
| 8 | 46 | Delete ",". |
| 10 | 17 | Change "was fallen" to -- fell --. |
| 10 | 44 | Change "Bt%" to -- at% --. |
| 12 | 47 | Change "EL" to -- a --. |

UNITED STATES PATENT AND TRADEMARK OFFICE
CERTIFICATE OF CORRECTION

PATENT NO. : 6,080,476
DATED : June 27, 2000
INVENTOR(S) : KANBE et al

It is certified that error appears in the above-identified patent and that said Letters Patent is hereby corrected as shown below:

| Column | Line | |
|---|---|---|
| 13 | 46 | Change "were decreased by every 4 nm." to -- were each decreased by 4 nm. --. |
| 14 | 36 | Change "reducer" to -- reduced --. |
| 15 | 66 | Delete ",,". |
| 15 | 67 | Change "undertaker" to -- underlayer --. |
| 16 | 7 | Change "Ad" to -- $\Delta d$ --. |
| 16 | 10 | Change "a s" to -- as --. |
| 16 | 15 | Change "krT" to -- $k \cdot T$ --. |
| 16 | 34 | Change "staid" to -- said --. |

Signed and Sealed this

Fifteenth Day of May, 2001

Attest:

NICHOLAS P. GODICI

Attesting Officer    Acting Director of the United States Patent and Trademark Office